United States Patent
Kobayashi et al.

(10) Patent No.: US 7,585,561 B2
(45) Date of Patent: Sep. 8, 2009

(54) THERMAL TRANSFER RECORDABLE RELEASE SHEET AND ADHESIVE TAPE

(75) Inventors: Nobuhisa Kobayashi, Haga-gun (JP); Kazuyoshi Wakata, Utsunomiya (JP)

(73) Assignee: Oji Paper Co., Ltd., Tokyo (JP)

(*) Notice: Subject to any disclaimer, the term of this patent is extended or adjusted under 35 U.S.C. 154(b) by 368 days.

(21) Appl. No.: 11/337,851

(22) Filed: Jan. 23, 2006

(65) Prior Publication Data
US 2006/0127610 A1 Jun. 15, 2006

Related U.S. Application Data

(62) Division of application No. 10/467,124, filed on Aug. 4, 2003, now Pat. No. 7,419,708.

(51) Int. Cl.
*B32B 7/12* (2006.01)
*B32B 15/04* (2006.01)

(52) U.S. Cl. .................. 428/352; 428/32.81; 428/40.1; 428/41.5; 428/41.7; 428/41.8; 428/42.3; 428/343; 428/354; 428/447

(58) Field of Classification Search .............. 428/32.81, 428/40.1, 41.5, 41.7, 41.8, 42.3, 343, 352, 428/354, 447
See application file for complete search history.

(56) References Cited

U.S. PATENT DOCUMENTS

| | | | | |
|---|---|---|---|---|
| 5,302,427 A | * | 4/1994 | Murschall et al. | 428/34.2 |
| 5,436,041 A | * | 7/1995 | Murschall et al. | 428/34.2 |
| 5,457,051 A | | 10/1995 | Takiguchi et al. | |
| 5,851,640 A | * | 12/1998 | Schuhmann et al. | 428/200 |
| 5,882,753 A | * | 3/1999 | Pedginski et al. | 428/40.7 |
| 5,918,099 A | * | 6/1999 | Schlueter et al. | 399/333 |
| 5,932,352 A | | 8/1999 | Higgins | |
| 6,045,895 A | * | 4/2000 | Hyde et al. | 428/213 |
| 6,069,191 A | | 5/2000 | Tanaka et al. | |

FOREIGN PATENT DOCUMENTS

| | | |
|---|---|---|
| JP | 11-106715 | 4/1999 |
| JP | 11-158443 | 6/1999 |
| JP | 11-228924 | 8/1999 |
| JP | 11-268194 | 10/1999 |
| JP | 2000-073021 | 3/2000 |
| WO | WO-97/19128 | 5/1997 |

OTHER PUBLICATIONS

Search Report for PCT/JP01/00969 dated May 1, 2001; ISA/JP.

* cited by examiner

*Primary Examiner*—Bruce H Hess
*Assistant Examiner*—David J Joy
(74) *Attorney, Agent, or Firm*—Harness, Dickey & Pierce, P.L.C.

(57) ABSTRACT

A thermal transfer recordable release sheet with a release agent layer of a release agent composition provided on at least one surface of a substrate. The release agent composition comprises at least one thermoplastic resin and/or thermoplastic elastomer selected from a group consisting of polyurethane resins, polyester resins, polyamide resins, ethylene-vinyl acetate copolymers, long chain alkyl compounds produced by reacting a vinyl acetate (co)polymer and an alkyl isocyanate, polyisobutylenes, buyl rubbers, brominated butyl rubbers, chlorinated butyl rubbers, polyisoprenes and polybutadienes, as well as a polydimethylsiloxane. An adhesive layer is provided on such a release sheet, on the opposite surface to the release agent layer to form an adhesive tape.

8 Claims, No Drawings

THERMAL TRANSFER RECORDABLE RELEASE SHEET AND ADHESIVE TAPE

CROSS-REFERENCE TO RELATED APPLICATIONS

This patent application is a divisional of U.S. patent application Ser. No. 10/467,124, now U.S. Pat. No. 7,419,708, filed Aug. 4, 2003, which is hereby incorporated by reference in its entirety.

TECHNICAL FIELD

The present invention relates to a release sheet and an adhesive tape. More specifically, the invention relates to a release sheet and an adhesive tape which display excellent releasability from an adhesive layer, excellent printing and print recordability for thermal transfer systems using an ink ribbon or the like, little susceptibility to slipping when release agent layers are placed together, little susceptibility to blocking, and no ink soiling.

BACKGROUND ART

Typically, release sheets are used for protecting adhesive layer surfaces such as labels prior to use, and consequently a release agent layer is provided on at least one surface of the substrate. Furthermore in an adhesive tape, an adhesive layer is provided on one surface of a substrate, and a release agent layer is provided on the other surface. Long chain alkyl group containing compounds, silicone modified resin based release agents or silicone based release agents are typically used as the release agent, and silicone based release agents are currently the most widely used as they exhibit excellent releasability relative to adhesives.

However, in the aforementioned silicone based release agents, the critical surface tension for the surface of the release agent layer is small, and writing on the surface of the release agent layer with a marker pen or conducting thermal transfer printing with an ink ribbon is impossible. Furthermore, the coefficient of friction is low, making the surface slippery, and stepping on a pile of stored release sheets can result in the person slipping and falling over, whereas in a rolled state, slippage in the width direction can cause finishing loss or loss within secondary processing. Furthermore, when used as an adhesive tape, because the back surface of the tape is slippery, if corrugated fiberboard boxes which have been packed using this tape are piled up, then the tape is likely to cause undesirable slipping or collapse within the pile of boxes.

Moreover, release sheets with a coating of a long chain alkyl group containing compound as a release agent also exist. A release agent layer using this type of long chain alkyl group containing compound has a high coefficient of friction for the release surface, and consequently is resistant to slipping, and can be drawn on with an oil based marker pen or the like. However, long chain alkyl group containing compounds also suffer problems in that the release force is too high when compared with silicone based release agents, and furthermore the heat resistance is poor, so that if exposed to high temperature while bonded to an adhesive layer, the release layer becomes difficult to remove, causing abnormal release. Furthermore, almost all long chain alkyl group containing compounds display poor printing and print recordability using thermal transfer systems. In other words, ink transfer to the surface of the release agent by thermal transfer was not unsatisfactory, and the adhesion of ink to the release agent surface was almost non-existent.

In this manner, both silicone based release agents and long chain alkyl group containing compounds offer advantages and disadvantages and a release sheet with a release agent layer capable of resolving the shortcomings of both of the above types of compounds, namely a release sheet with excellent releasability, printing and print recordability, which is slip resistant (or non-slip) and offers superior heat resistance, as well as an adhesive tape which uses such a release sheet, have become keenly sought. Furthermore, when thermal transfer methods are used to attempt to print to the surface of a conventional release sheet or adhesive tape, either the ink does not transfer satisfactorily, or even if the ink does transfer, it is easily removed, making such printing impossible in practical applications. Consequently, a release sheet which combines releasability and printability, as well as an adhesive tape using such a release sheet have become keenly sought.

The inventors of the present invention have already proposed, in Japanese Unexamined Patent Application, First Publication No. Hei 11-228924, a release agent layer in which either the mass ratio is defined between a specific silicone and an organic resin with a glass transition point which falls within a specific range, or alternatively the mass ratio is defined between three essential components, namely, a specific silicone, a cellulose derivative and a reactive organic resin based control agent, and the contact angle of the surface of a release agent layer formed by applying a release agent comprising the aforementioned 2 components or 3 components, and the release force of an adhesive layer relative to the surface of the release agent layer are also restricted to a specific range of values. By providing this release agent layer, an adhesive tape can be obtained which can be written on, displays non-slip characteristics, and for which overlapping adhesion is possible.

However, in order to apply the invention proposed above and use it within a release sheet application, the proportion of each component in the blended release agent composition containing a polydimethylsiloxane and a polymer resin was altered to try and adjust the balance between the writability, the coefficient of friction and the release force and the like, but the desired performance could not always be obtained. For example, even if the proportion of the polymer resin was increased to try and impart writability, non-slip characteristics and a suitable level of releasability, in some cases, almost the same quality was obtained regardless of the polymer content. In addition, even if the same release agent recipe was used, when the release agent compositions were then applied to a substrate and dried, the resulting physical characteristics such as the writability, the coefficient of friction, and the level of release force relative to an identical adhesive could vary, and in some cases a uniform quality could not be obtained.

Furthermore, the inventors of the present invention have also proposed, in Japanese Unexamined Patent Application, First Publication No. 2000-73021, a thermal transfer printable adhesive tape wherein a synthetic resin layer is provided on one surface of an adhesive tape substrate, and the glass transition temperature (Tg) of the synthetic resin which comprises the main component of the synthetic resin layer is no more than −20° C. and the contact angle (measured using a water and ethanol solution with a 1:1 mass ratio, with measurement conducted 60 seconds after dropping a drop of volume 5 µl) of the synthetic resin layer surface is within a range from 25 to 70°, and an adhesive layer is provided on the other surface of the substrate. According to this invention, an adhesive tape and an adhesive sheet which required no release sheet, and enabled both good releasability from the adhesive, and good printing and print recordability using thermal transfer systems could be provided.

However, depending on the type of synthetic resin used in Japanese Unexamined Patent Application, First Publication No. 2000-73021, in those cases in which a coating layer such as a synthetic resin layer or a release agent layer was provided and the tape was then stored in a roll paper, blocking (a phenomenon in which stickiness develops) could develop between the surface of the applied layer and other surfaces, and the ink layer from the ink ribbon sometimes transferred to the surface of the release agent layer even though printing was not intended (hereafter this is referred to as ink soiling). This type of blocking and ink soiling become more marked under heat treatment or with the passage of time.

Accordingly, an object of the present invention is to provide a release sheet and an adhesive tape which display superior characteristics such as excellent releasability from an adhesive layer, excellent printing and print recordability for thermal transfer systems, little susceptibility to slipping when release agent layers are placed together, as well as little susceptibility to blocking, no ink soiling, and superior writability.

DISCLOSURE OF INVENTION

As a result of intensive research aimed at resolving the problems described above, the inventors of the present invention discovered that a release sheet using a release agent layer containing a specific polymer resin and polydimethylsiloxane, and an adhesive tape using such a release sheet, were able to resolve the above problems, and were hence able to complete the present invention.

In other words, a first aspect of the present invention provides a thermal transfer recordable release sheet with a release agent layer of a release agent composition provided on at least one surface of a substrate, wherein the release agent composition comprises at least one thermoplastic resin and/or thermoplastic elastomer selected from a group consisting of polyurethane resins, polyester resins, polyamide resins, ethylene-vinyl acetate copolymers, long chain alkyl compounds produced by reacting a vinyl acetate (co)polymer and an alkyl isocyanate, polyisobutylenes, butyl rubbers, brominated butyl rubbers, chlorinated butyl rubbers, polyisoprenes and polybutadienes, as well as a polydimethylsiloxane. By employing this type of configuration, a product with excellent balance between the releasability and the thermal transfer recordability of the release sheet can be achieved. Furthermore, slipping is unlikely when release agent layers are placed together, and overlapping adhesion is possible. Here, the term "thermal transfer" refers to molten thermal transfer and does not include sublimation thermal transfer.

A second aspect of the present invention provides a thermal transfer recordable release sheet with a release agent layer of a release agent composition provided on at least one surface of a substrate, wherein the release agent-composition comprises, as main components, a thermoplastic elastomer formed from at least one material selected from a group consisting of ethylene-propylene copolymers, ethylene-propylene terpolymers and ethylene-butene rubbers, as well as a polydimethylsiloxane, and the quantity of the polydimethylsiloxane within a release agent layer is within a range from 2 to 20 mass %. By employing this type of configuration, a release sheet can be obtained which displays excellent releasability from an adhesive layer, excellent printing and print recordability for thermal transfer systems, little susceptibility to slipping when release agent layers are placed together, as well as little susceptibility to blocking, and no ink soiling.

A third aspect of the present invention provides a thermal transfer recordable release sheet with a release agent layer formed by applying, to at least one surface of a substrate, a release agent composition formed by blending a polydimethylsiloxane and a thermoplastic resin and/or a thermoplastic elastomer, wherein the organic silicon content of the surface layer of the release agent layer at a depth of 5 nm, as measured by ESCA (Electron Spectroscopy for Chemical Analysis) is within a range from 5 to 30 atomic %. By employing this type of configuration, the suitability of the release sheet to thermal transfer becomes extremely favorable, and the balance between releasability and thermal transfer suitability is also excellent.

A fourth aspect of the present invention provides an adhesive tape wherein an adhesive layer is provided on a release sheet as described above, on the opposite surface to the release agent layer.

In the present invention, there are no particular restrictions on the substrate, and suitable examples include paper substrates such as craft paper, glassine paper, wood free paper, coated paper, crepe paper, impregnated paper, cast coated paper, synthetic paper and vapor deposition paper, as well as polymer films-and non-woven fabrics, and substrates formed from appropriate combinations and laminations of these substrates are also possible. The substrate may be either provided with a filler layer or have no filler layer, although in cases in which a coating liquid for a release agent layer which has been prepared using an organic solvent is to be applied to a paper substrate, the use of a substrate which has been subjected to filling treatment is preferred in order to suppress penetration of the organic solvent into the substrate. Furthermore, the release agent layer is preferably formed on top of the filler layer.

There are no particular restrictions on the filling treatment, and suitable treatments include methods in which a material containing an adhesive and/or a pigment as primary components is applied in advance as the filler layer, methods in which a thermoplastic resin such as a polyolefin (and preferably polyethylene) is laminated to the substrate (hereafter termed a polylaminate), and methods in which a polymer film is layered on top of the substrate. In those cases in which the coating liquid for the release agent layer comprises a thermoplastic elastomer incorporating ethylene, and the coating liquid for the release agent layer is prepared with an organic solvent, a filler layer comprising polyethylene has excellent adhesion and is consequently preferred, and polyethylene laminated paper containing a laminated layer of polyethylene, or laminated sheets comprising a layer of a polyethylene based film, offer a further improvement in the adhesion between the release agent layer and the substrate and are consequently preferred. Polylaminates are comparatively cheap, and are effective in preventing the penetration of the release agent coating liquid into the substrate, although they are not always ideal in those cases in which the release sheet or the adhesive tape is to be recycled and reused.

There are no particular restrictions on the smoothness of the surface of the release agent layer, although in terms of the ink transferability during print recording using a thermal transfer system, a smoother surface is preferred. Provided the smoothness measured in accordance with Japan TAPPI No. 5 is at least 500 seconds, a high gloss release sheet with a 60° surface gloss value of 50 to 90% (measured in accordance with JIS Z 8741) can be obtained, whereas if the smoothness is within a range from 50 to 500 seconds, then a matte finish release sheet with a 60° surface gloss value of 15 to 50% (measured in accordance with JIS Z 8741) can be obtained.

In cases in which the smoothness is less than 50 seconds, the irregularities on the release agent coated surface cause non-uniform thermal transfer at the surface, making transfer of the ink layer of the ink ribbon during printing difficult in some sections.

Examples of suitable adhesives include polyvinyl alcohol, polyvinyl pyrrolidone polyethyleneimine, polyacrylates, starches, cellulose derivatives, urethane resins, acrylic resins, polyester resins, alkyd resins, melamine resins, styrene-butadiene copolymer latexes, styrene-acrylic copolymer latexes and acrylate ester resins, and these adhesives can be used either singularly or in combinations.

Examples of suitable pigments include inorganic pigments such as calcium carbonate, kaolin, aluminum hydroxide, ground calcium carbonate, precipitated calcium carbonate, titanium oxide, talc, satin white, calcium sulfate, barium sulfate, zinc oxide and silica, as well as organic pigments such as polypropylene resins, polyethylene resins, styrene resins, acrylic-styrene resins, urea-formalin resins, melamine-formalin resins and benzoguanamine resins, and these pigments can be used either singularly or in combinations.

A polydimethylsiloxane is used in a release agent composition of the present invention. Polydimethylsiloxane exists as both an addition reaction type and a condensation reaction type. There are no particular restrictions on this reaction type, although addition reaction type silicones for which a low energy (low temperature, short time) curing reaction is possible are preferred. In cases in which an addition reaction type silicone is used, the silicone comprises functional groups such as alkenyl groups such as vinyl groups or hexenyl groups, as well as cross linking agents (SiH) for reacting with the functional groups and curing the silicone based release agent.

Furthermore, in order to form a coating film of the polydimethylsiloxane, a cross linking agent such as an organohydrogenpolysiloxane and a catalyst are also preferably added. In addition, auxiliaries including silane coupling agents for improving the adhesion to a substrate, or where necessary, resin based release control agents, silicone oils or silica for controlling the release force relative to an adhesive layer, may also be added.

However in the present invention, the quantity of the aforementioned auxiliaries does not exceed 50% of the total mass of the release agent. Furthermore, amongst the auxiliaries, the quantity of resin based release control agents is preferably no more than 35% of the total mass of the release agent. If this quantity exceeds 35% then the curability of the release agent deteriorates, and treatment at high temperature results in the release agent layer becoming difficult to remove, which is undesirable.

Furthermore, organic resin based release control agents typically include both uncreative types with no functional groups, and reactive types with functional groups. The former type has a strong release prevention effect, but because it does not undergo curing, the quantity of silicone migration is high, which results in a deterioration in the residual adhesive strength of the adhesive, and an increase in the speed dependency.

In contrast, the latter type undergoes reaction, and consequently silicone migration is limited and the speed dependency is small, and as a result, this type of reactive organic resin based release control agent preferably utilizes a material with a unit (a) comprising either a vinyl group or a hexenyl group shown below as a functional group, which contributes to the curing reaction.

$$CH_2=CH(CH_2)_x(CH_3)_2SiO_{1/2} \quad (a)$$

(wherein, x within the formula represents an integer of either 0 or 4)

Typically, the cured film strength of a silicone polymer varies depending on the cross linking density, so that, for example, when the cross linking density is low, a comparatively soft coating film is formed, whereas when the cross linking density is high, a hard coating film is formed. This adjustment of the coating film strength can be conducted in accordance with the desired product performance.

Furthermore, in order to ensure a suitable level of curability, the ratio of the organohydrogenpolysiloxane and the alkenyl groups within the polydimethylsiloxane, namely organohydrogenpolysiloxane/alkenyl groups (molar ratio) is preferably at least 1.

In terms of silicone catalysts, known platinum based catalysts or compounds containing introduced platinum catalysts are preferred, and chloroplatinic acid, complexes of chloroplatinic acid with olefins, and compounds of chloroplatinic acid with alcohols are particularly preferred. The quantity of the aforementioned catalyst varies depending on the type of substrate and the curing conditions (drying temperature, drying time, drying gas quantity), although quantities from 0.5 to 10 parts by mass per 100 parts by mass of the silicone are preferred. However, if the quantity of added silicone is less than 5 mass %, then in cases in which silicone migration is not of a significant level, or in cases in which silicone migration into the adhesive is caused intentionally, the quantity of the aforementioned catalyst may be less than 0.5 parts by mass.

The quantity of polydimethylsiloxane within the release agent layer must be within a range from 2 to 20 mass %, and preferably from 2 to 15 mass %. At quantities less than 2 mass %, the label or tape applied to the release sheet becomes difficult to remove, and cases may arise in which the label or tape is not able to be removed, meaning the release sheet is unable to perform its intended function, or in the case of an adhesive tape with an adhesive layer provided on the opposite surface of the release sheet to the release agent layer, the unwinding force of the adhesive tape may become overly high, either making passage through a printer unstable, or making unwinding impossible and thereby preventing use of the adhesive tape. In contrast, if the quantity exceeds 20 mass % then the thermal transfer recordability and non-slip characteristics are unable to be exhibited adequately which is also undesirable.

The thermoplastic resin or thermoplastic elastomer used in the first aspect of the present invention utilizes at least one material selected from a group consisting of polyurethane resins, polyester resins, polyamide resins, ethylene-vinyl acetate copolymers, long chain alkyl compounds produced by reacting a vinyl acetate (co)polymer and an alkyl isocyanate, polyisobutylenes, butyl rubbers, brominated butyl rubbers, .chlorinated butyl rubbers, polyisoprenes and polybutadienes. By using these materials, the suitability-of the release sheet for printing using thermal transfer systems is improved.

By using the above thermoplastic resins and/or thermoplastic elastomers as a polymer resin, at normal temperatures the releasability is mainly exhibited through the silicone layer sections, whereas on heating, it is thought that the thermoplastic resin and/or thermoplastic elastomer layer sections soften or melt, causing the transfer and fixing of the ink layer of the ink ribbon. In other words, in order to exhibit thermal transfer printability, the aforementioned polymer resin must be a thermoplastic resin and/or thermoplastic elastomer, and if a thermosetting resin is used then the thermal transfer printability deteriorates.

By incorporating this type of polymer resin in the polydimethylsiloxane, formation of the coating film of the release agent occurs with the polymer resin and the silicone in an islands-and-sea type structure, and it is thought that the polymer resin sections exhibit increased resistance to release, better oil based ink absorption, and better friction characteristics (an increase in the coefficient of friction), and the state of the distribution of the two components within the surface layer of the coating film causes changes in the quality.

In the third aspect of the present invention, a release agent layer is formed by applying, to at least one surface of a substrate, a release agent composition formed by blending the aforementioned polydimethylsiloxane and the polymer resin, and provided the organic silicon content of the surface layer of the release agent layer at a depth of 5 nm, as measured by ESCA (Electron Spectroscopy for Chemical Analysis) is within a range from 5 to 30 atomic %, the targeted characteristics of the present invention such as writability, non-slip characteristics, and a suitable release force which means that an adhesive label does not peel off too easily, can be achieved. Furthermore, provided a thermoplastic resin and/or a thermoplastic elastomer is used as the polymer resin, printing by thermal transfer becomes possible. The organic Si content can be determined experimentally using spectroscopy of photoelectrons generated by X-ray excitation (ESCA), and is calculated as a percentage, wherein the total number (total number of atoms) of the different types of atoms measurable by elemental analysis through ESCA is set to 100. In the present invention, in order to determine organic Si content, an Escalab 250 (manufactured by VG of England) was used, and measurements were conducted under conditions including MgK-α (X-rays), CAE=100 eV, STEP=999.633 meV scans=2, time=49.2 s, and a photoelectron incident angle (θ)=30° (measurement depth 5 nm), and the silicon content value refers to the number of organic silicon atoms in the surface layer of the release agent layer as measured by elemental analysis using electron spectroscopy through X-ray excitation, expressed as a percentage of the total number of atoms [X=(number of organic silicon atoms at a specific depth within the release agent layer/the total number of atoms at the specific depth within the release agent layer)× 100 (%)].

At quantities less than 5 atomic %, a superior level of non-slip characteristics can be exhibited, but during thermal transfer printing, an excessive quantity of ink is transferred from the ink layer, and recording and distinguishing the desired information accurately becomes difficult, and furthermore the release force becomes overly strong, making the adhesive layer difficult to remove from the release sheet, and moreover in the case of an adhesive tape, the tape becomes difficult to unwind, or may become impossible to unwind, thereby preventing use of the adhesive tape. In contrast, if the quantity exceeds 30 atomic % then the desired writability, printability by thermal transfer systems and non-slip characteristics cannot be adequately exhibited, or the adhesive layer may peel away from the release sheet too easily, which is also undesirable. However, in cases in which a polymer resin with almost no releasability is used, such as the case of a cellulose derivative, the aforementioned organic silicon content is preferably at least 10 atomic %.

The relationship between the mass ratios of the polydimethylsiloxane and the polymer resin, and the organic silicon content of the surface layer of the release agent layer at a depth of 5 nm is somewhat repeatable if the same conditions (drying temperature drying time, processing speed, quantity of application) and the same processing device are used, but if any of the above conditions vary, then even the same composition will suffer from variations in the organic silicon content, and the targeted writability, non-slip characteristics and releasability may not be obtainable.

For example, even if the proportion of the polymer resin is high, if following application of the release agent the sheet is slowly dried in an oven, then the organic silicon content of the surface layer of the release agent layer at a depth of 5 nm can be increased, whereas even if the proportion of the polymer resin is low, if following application of the release agent the sheet is dried instantaneously, then the organic silicon content of the surface layer of the release agent layer at a depth of 5 nm can be lowered.

In other words, the mechanical characteristics (the writability, thermal transfer printability, non-slip characteristics, and a suitable level of releasability) of a release agent layer formed when a release agent composition formed from a blend of polydimethylsiloxane and a polymer resin is applied to a substrate, is influenced most strongly by the organic silicon content of the surface layer at a depth of 5 nm, rather than the mass ratio of the polydimethylsiloxane and the polymer resin, and if the organic silicon content of the surface layer at a depth of 5 nm is adjusted, then surface characteristics with the desired mechanical properties can be obtained.

The setting of the depth for the organic silicon content within the release agent layer was made as a result of investigating the relationship between the organic silicon content in a depthwise direction and the surface characteristics, taking into consideration the effect of the surface layer depth as measured by the aforementioned ESCA analysis, and it was discovered that the organic silicon content of the surface layer at a depth of approximately 5 un, and the surface characteristics (writability, thermal transfer printability, non-slip characteristics and releasability) displayed a correlation, and consequently the organic silicon content at a depth of 5 nm was specified. In other words, measurements at a layer shallower than 5 nm (less than 5 nm from the outermost surface layer) or at a layer deeper than 5 nm revealed no correlation between the organic silicon content and the surface characteristics. The reason for this finding is assumed to be that analysis of layers shallower than 5 nm from the surface layer are prone to large errors with current measuring devices, whereas in layers at a depth of greater than 5 nm, the distance from the outermost surface layer is overly large, and as a result the effect-on the characteristics of the release agent layer is small.

The polydimethylsiloxane and the polymer resin are either dissolved in an organic solvent such as toluene, n-hexane, ethyl acetate, cyclohexane, n-heptane or a mixture of such solvents, or alternatively emulsions of the two components are mixed together, or an emulsion liquid containing both components is diluted with a solvent such as water, IPA, ethanol, methanol or a mixture of such solvents, or used undiluted, and the solution or the emulsion is then applied and dried. A release sheet or an adhesive tape of the present invention is able to achieve the desired quality because of the organic silicon content in the surface layer of the release agent layer, and although there are no particular restrictions on the solid fraction applied within the release agent composition, from the viewpoint of achieving a uniform coating surface and good silicone curability, values from 0.05 to 5.0 $g/m^2$ are preferred.

Moreover, there are no particular restrictions on the coating method of applying the release agent, and suitable examples include gravure direct methods, gravure reverse methods, bar or rod coating methods and 3 roll coating methods. Furthermore, the temperature for curing and drying will vary depending on the type of silicone applied, and the construction and performance of the drying apparatus, although temperatures within a range from 70 to 140° C. are preferred.

The thermoplastic elastomer used in the second aspect of the present invention comprises, as a primary component, at least one material selected from a group consisting of ethylene-propylene copolymers, ethylene-propylene terpolymers and ethylene-butene rubbers. By using this type of thermoplastic elastomer, a release sheet and an adhesive tape can be obtained with excellent releasability from an adhesive layer, excellent printing and print recordability for thermal transfer systems using an ink ribbon or the like, little susceptibility to slipping when release agent layers are placed together, little susceptibility to blocking, and no ink soiling. These thermoplastic-elastomers may have random, block or graft configurations.

There are no particular restrictions on the diene component of an ethylene-propylene terpolymer, and suitable examples include dicyclopentadiene, ethylidenenorbornene and 1,4-hexadiene.

The ethylene content within the thermoplastic elastomer is preferably at least 50 mass %. Provided the ethylene content is at least 50 mass %, the release force relative to the adhesive layer can be prevented from becoming too high, and a more suitable releasability can be ensured.

There are no particular restrictions on the viscosity of the aforementioned thermoplastic elastomer, although a Mooney viscosity ($ML_{1+4}$, at 100° C.) of approximately 30 to 150 is preferred, and values from 50 to 120 are even more desirable. If the Mooney viscosity is lower than 30 then blocking caused by stickiness on the provided release agent layer can become a problem, whereas if the Mooney viscosity exceeds 150, then handling type problems may develop such as a deterioration in the solubility within the types of organic solvents described below, or a worsening of the extrusion lamination capabilities.

In order to improve heat resistance, weather resistance or chemical resistance, or alternatively regulate the viscosity, the type of thermoplastic elastomer described above may also contain auxiliaries such as styrene-butadiene rubbers, butyl rubbers, nitrile rubbers, polybutadiene rubbers, styrene based thermoplastic elastomers, vinyl chloride rubbers, polyisobutylenes, polyisoprenes, ethylene-vinyl acetate copolymers, or polymer alloys of two or more of the above materials, provided the addition of such auxiliaries does not impair the effects of the present invention.

By providing a release agent layer formed from a blend of a thermoplastic elastomer of the present invention and an addition reaction type dimethylpolysiloxane, during coating film formation and at normal temperatures, the silicone component is configured at the outermost surface of the release agent layer, meaning the releasability of the silicone layer sections can be effectively exhibited, whereas on heating by a thermal transfer system, it is thought that the thermoplastic elastomer component softens and bleeds through to the outer surface layer, providing affinity with the ink layer of the ink ribbon, that is, exhibiting transferability and adhesion characteristics. Here, when thermal transfer recording is described as being possible, this refers to molten transfer being possible.

Furthermore, in order to obtain a release sheet with non-slip characteristics of the present invention, the coefficient of dynamic friction in the horizontal direction of opposing release agent layers of release sheets, measured in accordance with JIS P 8147, must be at least 0.3. If this value is less than 0.3 then when a wound release sheet is subjected to secondary processing such as adhesive coating, the sheet may slide on the roller causing product loss due to slippage in a widthwise direction, and moreover inadvertently stepping on a pile of stored release sheets can result in the person slipping, and furthermore in the case of an adhesive tape, because the back surface of the tape is slippery, if corrugated fiberboard boxes which have been packed and sealed using this tape are piled up and transported, or if labels are printed on the back surface of the tape using a thermal transfer system and then adhered to vessels, which are then piled up and transported, then the tape may cause undesirable slipping or collapse within the pile. Furthermore, even if the coefficient of static friction exceeds 0.3, if the coefficient of dynamic friction is less than 0.3, then if a pile of boxes is inclined beyond a certain angle, or when a certain degree of force is applied from laterally, the pile can collapse very easily. As a result, the coefficient of dynamic friction is preferably equal to, or greater than the coefficient of static friction.

The aforementioned coefficient of dynamic function can be adjusted by altering the quantities of the thermoplastic elastomer and the addition reaction type polydimethylsiloxane. Specifically, the coefficient of dynamic friction can be increased by using a low viscosity thermoplastic elastomer, adding auxiliaries such as polyisobutylenes or polyisoprenes, or reducing the quantity of the addition reaction type polydimethylsiloxane. However if too large a quantity of auxiliaries is added, or the quantity of the addition reaction type polydimethylsiloxane is lowered too far, then blocking of the release sheet becomes more likely, and so any such adjustments must be made within the range in which blocking does not occur.

There are no particular restrictions on the method of forming the release agent layer, and the method described below is a suitable example. Namely, the thermoplastic elastomer and the addition reaction type polydimethylsiloxane are dissolved in a-single organic solvent such as toluene, n-hexane, ethyl acetate, cyclohexane or n-heptane, or a mixed solvent of such organic solvents, stirred, and a platinum based catalyst is then added and the mixture stirred further to prepare a blended composition, and this composition is then applied to a substrate and dried to form the release agent layer. Alternatively, in light of the environmental issues of recent years, the thermoplastic elastomer and a non-solvent based polydimethylsiloxane could be mixed in a kneader, and the release agent layer then formed using an extrusion lamination method. There are no particular restrictions on the amount of the solid fraction applied within the blended composition, although considering the silicone curability, values within a range from 0.05 to 5.0 $g/m^2$ are preferred. Furthermore, in the case of extrusion lamination, there are no particular restrictions on the die temperature, although considering adhesion with the substrate, a temperature within a range from 250 to 350° C. is preferred, and a lamination thickness of approximately 5 to 50 μm is preferred.

There are no restrictions on the coating method used for applying the release agent composition, which is dissolved in an organic solvent as described above, to a substrate, and suitable methods include gravure direct methods, gravure reverse methods, bar or rod coating methods and 3 roll coating methods. Furthermore, the temperature for curing and drying will vary depending on the type of silicone applied, and the construction and performance of the drying apparatus, although temperatures within a range from 70 to 140° C. are preferred.

An adhesive tape of the fourth aspect of the present invention is an adhesive tape in which an adhesive layer is provided on a release sheet as described above, on the opposite surface to the release agent layer.

There are no restrictions on the adhesive used for the adhesive tape, and for example, urethane based adhesives, natural rubber based adhesives, synthetic rubber based adhesives and acrylic adhesives can be used as the elastomer component, to which are added adhesion imparting resins, and where necessary suitable quantities of other additives such as softeners, age resistors, cross linking agents and pigments.

When adhesive strength is particularly important, a cheap natural rubber based adhesive is preferably used, whereas when the unwinding force of the adhesive tape needs to be smoothed out or when a highly weather resistant product is required, an acrylic based adhesive is preferred.

In the case of an adhesive tape which utilizes a release sheet of the second aspect of the present invention, acrylic based adhesives are particularly preferred for the adhesive. There are no particular restrictions on this acrylic based adhesive, and suitable examples include adhesives comprising as primary components (preferably at least 80 mass %), a main monomer such as ethyl acrylate (EA), butyl acrylate (BA) or 2-ethylhexyl acrylate (2-EHA), and a comonomer such as vinyl acetate (VAc), acrylonitrile (AN), styrene (St), methyl methacrylate (MMA), acrylic acid (AA), itaconic acid (IA), hydroxyethyl methacrylate (HEMA), hydroxypropyl methacrylate (HPMA), dimethylaminoethyl methacrylate (DM), acrylamide (AM), methylol acrylamide (N-MAN), glycidyl methacrylate (GMA) or maleic anhydride. If natural rubber based adhesives or synthetic rubber based adhesives are used then there is a danger of the release force becoming excessively high. The reason for this observation is thought to be that the release agent layer is a blended composition comprising a thermoplastic elastomer, which is of similar properties to the elastomer component of a natural rubber based adhesive or a synthetic rubber based adhesive, and that therefore the SP values are similar. Accordingly, in those cases in which a rubber based adhesive is used, an adhesive with a large SP value difference from that of the release agent layer should be selected. The difference in SP values is preferably at least 1.0. Furthermore, where necessary, additives such as tackifiers, ultraviolet absorbers, cross linking agents, softeners, pigments and age resistors can also be added to the adhesive. An adhesive used in-an adhesive tape of the present invention can be prepared using the above raw materials, in accordance with commonly used methods.

The quantity of adhesive applied varies depending on the type of adhesive, although the quantity is preferably within a range from 10 to 70 g/m$^2$, and even more preferably from 20 to 70 g/m$^2$, and most preferably from 20 to 60 g/m$^2$. If the applied quantity is less than 10 g/m$^2$, then the sealing characteristics relative to corrugated fiberboard may deteriorate, whereas if the quantity exceeds 70 g/m$^2$, the anchoring of the adhesive can worsen, and problems can arise in that the adhesive may run over the edges of the tape, or the curling of labels printed or recorded using a thermal transfer printer will intensify, making handling more difficult.

There are no restrictions on the coating method of applying the adhesive, and suitable examples include comma coating methods, reverse coating methods, gravure coating methods, reverse gravure methods, kiss coat methods, knife coating methods, bar coating methods and transfer methods in which an adhesive that has been applied to a process paper by one of these methods is transferred.

An adhesive tape of the present invention is a tape in which an acrylic based adhesive is provided on a release sheet as described above, on the opposite surface to that on which the release agent layer is provided, and the tape is then wound. The unwinding force of the adhesive tape under conditions of 23° C. and 50% RH and at an unwind speed of 0.3 m/minute must fall within a range from 10 to 100 N/m, and is preferably from 15 to 80 N/m. Provided the unwinding force is from 10 to 100 N/m, smooth passage through a linerless thermal transfer printer is possible, and an adhesive tape in which the substrate will not rupture (interlayer cracking) during unwinding can be obtained. At unwinding force levels of less than 10 N/m, the adhesive tape unwinds more easily than is required, which is undesirable. In contrast, if the force exceeds 100 N/m then the load on the machinery during unwinding within a printer becomes overly large, which in some cases can result in burn out of the printer motor, and the curling of the adhesive tape following unwinding also increases, making it more difficult to stick adhesive tape labels, which have been printed or recorded, onto an object. In order to suppress the curling following unwinding of the adhesive tape, the unwinding force described above is preferably no more than 80 N/m. Here, the unwinding force is measured using an adhesive tape which has been stored for a specified time following production, and refers to the unwinding force when the tape is unwound using a tensile tester, at an unwind speed of 0.3 m/minute, in an atmosphere of 23° C. and 50% RH.

In the present invention, provided the release force of the adhesive tape from an aforementioned release agent layer is within a range from 30 to 200 N/m, then substrate rupture (interlayer cracking) does not occur during unwinding of the adhesive tape, and an adhesive tape for which overlapping adhesion is possible and which provides a smooth release can be obtained. If the release force is less than 30 N/m then overlapping adhesion deteriorates, and over time the tape may lift up off the back surface of the adhesive tape, whereas if the release force exceeds 200 N/m, release abnormalities may occur during unwinding, the tape becomes difficult to unwind, and substrate rupture (interlayer cracking) can occur. Here, release force refers to the value measured in accordance with JIS Z 0237.

EXAMPLES

As follows is a description of specifics of the present invention based on a series of examples, although the present invention is in no way restricted to the examples presented here. In the examples and the comparative examples, unless stated otherwise, the units "parts" and "%" refer to "parts by mass" and "mass %" values of a solid fraction or an active component.

Examples 1 to 3 and Comparative Examples 1 to 3

A laminated paper prepared by the extrusion lamination (extruded resin temperature at die lip exit 330° C., thickness 20 μm, cooling roll with a super mirror specification) of a medium density polyethylene of melting point 133° C. and density 0.939 g/cm$^3$ (LW04-1, manufactured by Tosoh Corporation) onto one surface of a wood free paper (manufactured by Oji Paper Co., Ltd., 64 g/m$^2$) was used as a substrate. An ethylene-propylene terpolymer with a Mooney viscosity (ML$_{1+4}$, at 100° C.) of 85, an ethylene content of 62 mass % and a specific gravity of 0.86 (EP75F, manufactured by JSR Corporation) as a thermoplastic elastomer, and an addition reaction type polydimethylsiloxane containing a cross linking agent (LTC300B, manufactured by Dow Corning Toray Co., Ltd.), were dissolved sequentially in a toluene solvent in the mass ratio shown in Table 1, a platinum based catalyst (SRX212, manufactured by Dow Corning Toray Co., Ltd.) was added in a quantity of 1.5 parts by mass per 100 parts by mass of the addition reaction type polydimethylsiloxane and stirred thoroughly, and the thus obtained mixed solution was applied to the laminated surface of the aforementioned laminated paper using a meyer bar to form a coating with a solid fraction of 1.5 g/m², which was then dried (oven temperature 130° C., drying time 30 seconds), yielding a release sheet. The organic silicon content of the surface layer at a depth of 5 nm was as shown in Table 1.

Example 4

With the exception of altering the thermoplastic elastomer to an ethylene-propylene terpolymer with a Mooney viscosity ($ML_{1+4}$, at 100° C.) of 90, an ethylene content of 66 mass % and a specific gravity of 0.86 (EP57C, manufactured by JSR Corporation), a release sheet was produced in the same maimer as the Example 2.

Example 5

With the exception of altering the thermoplastic elastomer to an ethylene-propylene copolymer with a Mooney viscosity ($ML_{1+4}$, at 100° C.) of 40, an ethylene content of 52 mass % and a specific gravity of 0.86 (EP11, manufactured by JSR Corporation), a release sheet was produced in the same manner as the Example 2.

Example 6

With the exception of altering the thermoplastic elastomer to an ethylene-propylene terpolymer with a Mooney viscosity ($ML_{1+4}$, at 100° C.) of 35, and an ethylene content of 63 mass % (ESP524, manufactured by Sumitomo Chemical Co., Ltd.) a release sheet was produced in the same manner as the Example 2.

Example 7

45 parts of an ethylene-propylene terpolymer with a Mooney viscosity ($ML_{1+4}$, at 100° C.) of 90, an ethylene content of 66 mass % and a specific gravity of 0.86 (EP57C, manufactured by JSR Corporation) as a-thermoplastic elastomer, 50 parts of an ethylene-butene rubber with a butene content of 20 mass % and a specific gravity of 0.88 (EBM2021 P, manufactured by JSR Corporation), 5 parts of a solvent free alkenyl functional polyorganosiloxane (DEHESIVE 636, viscosity 400 mPa·s, obtainable from Wacker Chemie GmbH Ltd.) as an addition reaction type polydimethylsiloxane, an additional organohydrogenpolysiloxane (V06, obtainable from Wacker Chemie GmbH Ltd.) in a quantity of 12.5 parts per 100 parts by mass of the addition reaction type polydimethylsiloxane, and a platinum based catalyst (OL, obtainable from Wacker Chemie GmbH Ltd.) in a quantity of 1.5 parts by mass per 100 parts by mass of the addition reaction type polydimethylsiloxane were added sequentially to a kneader, and the blended composition produced by mixing in the kneader was applied by extrusion lamination (extruded resin temperature at die lip exit 330° C., thickness 15 μm, cooling roll with a super mirror specfication) to one surface of a high quality paper substrate (manufactured by Oji Paper Co., Ltd., 64 g/m²), yielding a release sheet.

Comparative Example 4

Using a substrate as described in the Example 1, a long chain alkyl pendant type polymer (Peeloil 1010, manufactured by Ipposha Oil Industries Co., Ltd.) was dissolved in toluene as a release agent, and this solution was applied by hand to the laminated surface of the substrate to form a coating with a solid fraction of 0.1 g/m², which was then dried (drying temperature 100° C., drying time 30 seconds), yielding a release sheet.

Examples 8 to 12 and Comparative Examples 5 to 8

Adhesive tapes were prepared using an acrylic based adhesive (L145K, manufactured by Nippon Carbide Industries Co., Inc.) as an adhesive, which was applied to the surfaces opposite to the release agent layers of the release sheets similar to those used in Examples 1 to 5 and the Comparative Examples 1 to 4 to form a coating with a solid fraction of 25 g/m², which was subsequently dried. The results of evaluating these adhesive tapes are shown in Table 2.

Comparative Example 9

An adhesive composition formed from 100 parts of natural rubber (RSS#3), 90 parts of a petroleum resin (Quintone S-100, softening point 94° C., manufactured by Zeon Corporation) as an adhesion imparting agent, 25 parts of a terpene based liquid softening resin (Dimeron, manufactured by Yasuhara Chemical Co., Ltd.) as a softening agent, 0.8 parts of a cross linking agent (Millionate MR-100, manufactured by Nippon Polyurethane Industry Co., Ltd.) and 1 part of an age resistor (Nocrac NS-5, manufactured by Ouchishinko Chemical Industrial Co., Ltd.) was dissolved in toluene, applied to the opposite surface of the release sheet of the Example 2 to the release agent layer, in sufficient quantity to generate 20 g/m², dried, and then wound to form an adhesive tape. The difference between the SP values of the adhesive and the release agent component was less than 1.0.

The release sheets and the adhesive tapes produced in the Examples and the Comparative Examples described above were evaluated using the methods described below, and the results of these evaluations are shown in Table 1 (release sheets) and Table 2 (adhesive tapes).

<Releasability>

In order to evaluate the releasability of the release sheets from an adhesive layer the adhesive tape described in the Example 9 was unwound in an atmosphere of 23° C. and 50% RH, and stuck to the surface of the release agent layer of each of the release sheets as an adhesive sheet, and following the rolling of a 2 Kg crimping roller across, and then back across the surface, the ease with which the adhesive sheet could be peeled off by hand was evaluated using the following standards.

○: the release sheet could be removed easily.

Δ: the release sheet was somewhat difficult to remove, although within acceptable limits.

×: removal of the release sheet was difficult.

<Thermal Transfer Recordability, Printability>

Using a Datamax Corporation bar code label printer (Prodigy Plus Linerless) as a linerless thermal transfer printer which does not require release paper, and a commercially available wax based ink ribbon (FTR-UA-1130, manufactured by Fujicopian Co., Ltd.), a solid black ink section, a code 39 symbolized bar code using a narrow bar width of 0.0096 inch, and the roman letters from A to Z were printed onto the release agent layer surface of each of the release sheets and the adhesive tapes described above, under conditions including a recording speed of 3 inch/second, and an applied energy of 0.60 mj/dot. The printed samples were evaluated visually, and the bar code symbol was scanned using a bar code scanner (LASERCHEK-II, manufactured by Datamax Bar Code Products Corporation) in accordance with the ANSI X3.182-1990 standards, and each samples was graded from A to F for the parameters (1) minimum reflectance, (2) symbol contrast, (3) minimum edge contrast, (4) modulation,.(5) defects (frequency), and (6) decodability, and the lowest grade amongst these parameters was assigned as the overall ANSI grade. Scanning was performed 10 times, and the average value of the overall ANSI grades was used as the grade for the bar code symbol. An A grade is the, highest quality ANSI grade, and an F grade represents a failed reading. The ink transferability following the blocking test described below (used in the case of a release sheet) or following the heat resistance test (in the case of an adhesive tape) was also evaluated visually and using the above ANSI grading.

(Visual Evaluation)

⊖: The ink ribbon image on printing or print recording is well defined.

◯: The printed or recorded ink ribbon image is slightly blurred (miss dot), but is still essentially well defined.

Δ: The ink ribbon image on printing or print recording is somewhat blurred (miss dot), or has been partially transferred to unintended sections (ink soiling) in some places, but is somewhat defined (usable limit for practical applications).

×: The ink ribbon image on printing or print recording is blurred (miss dot), or has been transferred to unintended sections (ink soiling) in places, and is not well defined (unusable in a practical application).

××: printing or print recording is not possible, and the ink ribbon is not transferred.

<Ink Abrasion Resistance>

Using a color fastness tester (FR-2, manufactured by Suga Test Instruments Co., Ltd.), a rubber was held against the recorded surface (a section containing the transferred ink from the ink ribbon) of an adhesive sheet or an adhesive tape, and the rubber was then drawn back and forth across the recorded surface with a 500 g weight (constant), for a maximum of 50 repetitions, and the number of repetitions at the point that changes such as ink blurring, ink soiling or ink removal or the like developed in the recorded sections was recorded, and then evaluated based on the standards listed below. Following this test, the bar code symbol was scanned using a bar code scanner (LASERCHEK-II, manufactured by Datamax Bar Code Products Corporation) in accordance with the ANSI X3.182-1990 standards, and the sample was graded from A to F for the parameters (1) minimum reflectance, (2) symbol contrast, (3) minimum edge contrast, (4) modulation, (5) defects (frequency), and (6) decodability, and the lowest grade amongst these parameters was assigned as the overall ANSI grade. Scanning was performed 10 times, the average value of the overall ANSI grades was used as the grade for the bar code symbol.

(Visual Evaluation)

◯: Even after 40 repetitions, ink blurring, ink soiling or ink removal did not occur.

Δ: Ink blurring, ink soiling or ink removal did not occur after 30 repetitions (but did occur at less than 40 repetitions) (usable limit for practical applications).

×: Ink blurring, ink soiling or ink removal developed after less than 30 repetitions.

<Blocking>

The release agent layer surface of a produced release sheet was attached to another surface, and with a load of 25 g/cm$^2$ applied, the sheets were stored at 70° C. for 20 hours. Subsequently, the adhesive strength between the release agent layer surface of the release sheet and the other surface was measured in an atmosphere of 23° C. and 50% RH in accordance with JIS Z 0237, using a tensile tester and a peel speed of 0.3 m/minute, and the result was then evaluated based on the following standards.

◯: The adhesive strength is no more than 2 N/m, and no scuffing or tearing occurs on the surface of the release agent layer surface or the other surface.

Δ: The adhesive strength is more than 2 N/m but less than 5 N/m, and some scuffing occurs on the surface of the release agent layer surface or the other surface.

×: The adhesive strength is at least 5 N/m, and scuffing or tearing occurs on the surface of the release agent layer surface or the other surface.

<Coefficient of Dynamic Friction>

Using a coefficient of friction test method according to JIS P 8147, the coefficient of dynamic friction in a horizontal direction was measured between the release agent treated surface of a release sheet or an adhesive tape and another similar release agent treated surface.

<Adhesive Tape Unwinding Force>

Following storage of a produced adhesive tape for 7 days under an atmosphere of 23° C. and 50% RH, the unwinding force when the tape was unwound was measured using a tensile tester, at an unwind speed of 0.3 m/minute, in an atmosphere of 23° C. and 50% RH.

<Adhesive Tape Heat Resistance>

Following storage of a produced adhesive tape for 1 day in an atmosphere of 70° C., the adhesive tape was tested under an atmosphere of 23° C. and 50% RH, using a deformation peeling tester (manufactured by Tester Sangyo Co., Ltd.), a peel angle of 90° and a peel speed of 10 m/minute, and the tape was inspected visually for evidence of lifting of the polyethylene laminated layer, interlayer cracking of the substrate, or cobwebbing between the adhesive layer and the release agent layer (a phenomenon in which a portion of the adhesive layer or the release agent layer develops thread like strands which link to the other layer). Here, lifting of the polyethylene laminated layer (polyethylene lifting) refers to the situation in which the release force has strengthened, causing the laminated section to be pulled up, thereby forming irregularities in the surface, whereas substrate interlayer cracking describes the phenomenon in which the release agent coated surface and the adhesive coated surface do not release normally, and cracking develops between the substrate layers. Evaluations were performed using the following standards.

◯: No interlayer cracking or polyethylene lifting, suitable for practical application.

Δ: No interlayer cracking or polyethylene lifting, but some cobwebbing at the interface between the adhesive layer and the release agent layer.

×: Interlayer cracking or polyethylene lifting occur, unsuitable for practical application.

<Printer Passage of Adhesive Tape>

Using a Datamax Corporation bar code label printer (PRODIGY PLUS LINERLESS) as a linerless thermal transfer printer-which does not require release paper, and a commercially available wax based ink ribbon (FTR-UA-1130, manufactured by Fujicopian Co., Ltd.), an aforementioned adhesive tape was printed under conditions including a recording speed of 3 inch/second and an applied energy of 0.60 mj/dot, while the tape unwound automatically, and the passage of the adhesive tape through the printer was evaluated using the following standards.

○: Unwinding occurs smoothly, and passage through the printer is stable.
Δ: Unwinding is somewhat unstable on passage through the printer (limit for passage).
×: The load on printer power is considerable, unwinding is unstable, and passage through the printer is problematic.

<Curling>

Using a Datamax Corporation bar code label printer (PRODIGY PLUS LINERLESS) as a linerless thermal transfer printer which does not require release paper, and a commercially available wax based ink ribbon (FTR-UA-1130, manufactured by Fujicopian Co., Ltd.), an adhesive label (100 mm×100 mm) produced by printing an aforementioned adhesive tape under conditions including a recording speed of 3 inch/second and an applied energy of 0.60 mj/dot, while the tape unwound automatically, was placed in an atmosphere of 23° C. and 50% RH with the silicone coated surface of the release sheet facing downward, and the heights from the 4 corners of the release sheet were measured, and the average value of those heights was evaluated using the following standards.

○: The average value at the 4 corners is no more than 15 mm, a good result.
Δ: The average value at the 4 corners is within 25 mm, an acceptable result.
×: The average value at the 4 corners exceeds 25 mm, which is unsatisfactory.

TABLE 1

| | Component (a) thermoplastic elastomer | | Component (b) polydimethyl siloxane | | Other additives | Organic silicon | |
|---|---|---|---|---|---|---|---|
| | ethylene | | | | | | |
| | quantity (parts) | content (mass %) | quantity (parts) | content (mass %) | quantity (parts) | content (atomic %) | Releasability |
| Example 1 | 97 | 62 | 3 | 3 | SRX212 0.045 | 5.8 | Δ |
| Example 2 | 90 | 62 | 10 | 10 | SRX212 0.15 | 19.2 | ○ |
| Example 3 | 82 | 62 | 18 | 18 | SRX212 0.27 | 25.4 | ○ |
| Example 4 | 90 | 66 | 10 | 10 | SRX212 0.15 | 18.4 | ○ |
| Example 5 | 90 | 52 | 10 | 10 | SRX212 0.15 | 18.0 | ○ |
| Example 6 | 90 | 63 | 10 | 10 | SRX212 0.15 | 18.6 | ○ |
| Example 7 | 90 | 73.4* | 10 | 9.9 | V06: 1.2 OL: 0.15 | 21.4 | ○ |
| Comparative Example 1 | 99 | 62 | 1 | 1 | SRX212 0.015 | 3.1 | × |
| Comparative Example 2 | 70 | 62 | 30 | 30 | SRX212 0.45 | 31.8 | ○ |
| Comparative Example 3 | 0 | — | 100 | 98.5 | SRX212 1.5 | 39.8 | ○ |
| Comparative Example 4 | peeloil 1010:100 | — | 0 | 0 | none | N.D. not detected | Δ |

| | Blocking | Abrasion resistance | Thermal transfer recordability (visual/ANSI grade) | | | Coefficient of dynamic friction |
|---|---|---|---|---|---|---|
| | | | prior to abrasion test | after abrasion test | after blocking test | |
| Example 1 | ○ | ○ | ⊙/A | ⊙/A | ⊙/A | 1.06 |
| Example 2 | ○ | ○ | ⊙/A | ○/B | ⊙/A | 0.92 |
| Example 3 | ○ | Δ | ○/B | ○/B | ○/B | 0.70 |
| Example 4 | ○ | ○ | ⊙/A | ○/B | ⊙/A | 0.90 |
| Example 5 | ○ | ○ | ⊙/A | ○/B | ⊙/A | 0.94 |
| Example 6 | ○ | ○ | ⊙/A | ○/B | ⊙/A | 0.86 |
| Example 7 | ○ | ○ | ⊙/A | ○/B | ⊙/A | 0.72 |
| Comparative Example 1 | × | ○ | ⊙/A | ⊙/A | ○/B | 1.46 |
| Comparative Example 2 | ○ | × | ×/F | ×/F | ×/F | 0.44 |
| Comparative Example 3 | ○ | a/n** | ×/F | a/n | ×/F | 0.08 |
| Comparative Example 4 | ○ | × | Δ/C | ×/D | Δ/C | 0.42 |

*Calculated value
**n/a: Testing was impossible

TABLE 2

| | Release sheet used | Unwinding force (N/m) | Printer passage | Hest resistance | Abrasion resistance | Printability (visual/ANSI grade) prior to abrasion test | after abrasion test | after heat resistance test | Curling |
|---|---|---|---|---|---|---|---|---|---|
| Example 8 | Example 1 | 82 | ○ | ○ | ○ | ⊖/A | ⊖/A | ⊖/A | Δ |
| Example 9 | Example 2 | 43 | ○ | ○ | ○ | ⊖/A | ○/B | ⊖/A | ○ |
| Example 10 | Example 3 | 26 | ○ | ○ | Δ | ○/B | ○/B | ○/B | ○ |
| Example 11 | Example 4 | 22 | ○ | ○ | ○ | ⊖/A | ○/B | ⊖/A | ○ |
| Example 12 | Example 5 | 38 | ○ | ○ | ○ | ⊖/A | ○/B | ⊖/A | ○ |
| Comparative Example 5 | Comparative Example 1 | 123 | Δ | ○ | ○ | ⊖/A | ⊖/A | ⊖/A | x |
| Comparative Example 6 | Comparative Example 2 | 18 | ○ | ○ | x | x/F | x/F | x/F | ○ |
| Comparative Example 7 | Comparative Example 3 | 10 | ○ | ○ | a/n | x/F | a/n | x/F | ○ |
| Comparative Example 8 | Comparative Example 4 | 140 | Δ | x interlayer cracking | x | Δ/C | x/D | a/n | ○ |
| Comparative Example 9 | Example 2 | 250 | x | x interlayer cracking | a/n | a/n | a/n | a/n | a/n |

As is evident from Table 1, the release sheets of the Examples 1 to 7 combined excellent printing and print recordability for thermal transfer systems, excellent releasability between the release agent layer and the adhesive layer, little susceptibility to slipping, and good resistance to blocking. In addition, the adhesive tapes prepared in the Examples 8 to 12 combined good passage through a linerless thermal transfer printer, printability with an ink ribbon, good heat resistance and little curling.

The release sheet of the Comparative Example 1 shown in Table 1 showed poor releasability from the adhesive layer, and as shown by the Comparative Example 5 in Table 2, in the case where an adhesive layer was provided on the opposite surface of the release sheet to the release agent layer, the release force from the adhesive layer, including the unwinding force, increased significantly, causing problems such as poor printer passage and curling. Furthermore, the release-agent layer of the release sheet and another surface were susceptible to blocking, meaning handling during processing was poor. The release sheets of the Comparative Example 2 and the Comparative Example 3 displayed almost no thermal transfer recordability to the release agent layer. In the case of the Comparative Example 4, the printing and print recordability using a thermal transfer system was of a very low level, and following the abrasion test, the bar code could hardly be read using the bar code scanner.

The adhesive tapes of the Comparative Example 5 and the Comparative Example 9 shown in Table 2 displayed high unwinding forces, and in the Comparative Example 5 the printer passage was unstable, whereas with the adhesive tape of the Comparative Example 9, recording was impossible with the thermal transfer printer described above. In addition, in the case of the adhesive tape of the Comparative Example 9, unwinding of the adhesive tape was impossible following the heat treatment, even using the deformation peeling tester, and when an attempt was made to forcibly unwind the tape by hand, interlayer cracking occurred. The adhesive tapes of the Comparative Example 6 and the Comparative Example 7 showed almost no recordability with the above thermal transfer printer, and reading with the bar code scanner was impossible. The adhesive tape of the Comparative Example 8 displayed a high unwinding force, and the printability and heat resistance were also poor.

Example 13

Cast coated paper (N mirror, manufactured by Oji Paper Co., Ltd., gloss surface smoothness of 3300 seconds) was used as a substrate. A release agent was formed by adding 90 parts of an emulsion type long chain alkyl compound (K-256, manufactured by Chukyo Yushi Co., Ltd., solid fraction concentration 20%) to 10 parts of an emulsion type silicone (X52-195, manufactured by Shin-Etsu Chemical Co., Ltd., solid fraction concentration 40%, functional group: vinyl group), and the resulting blend was mixed and then diluted by adding water and IPA. To 100 parts of this mixed solution was added 0.5 parts of a curing catalyst (CAT-PM-10A, manufactured by Shin-Etsu Chemical Co., Ltd.), and the resulting mixed solution was used as the release agent coating liquid. This release agent coating liquid was applied to, and dried on, the filler layer surface of the substrate, using a test coater at a process speed of 10 m/minute, to form a coating with a solid fraction of 0.6 g/m$^2$ (time from the application head until entry to the oven: approximately 1.1 seconds, oven maximum temperature 130° C., drying time 25 seconds), thereby yielding a release sheet with a release layer in which the organic silicon content of the surface layer at a depth of 5 nm was 6.0%.

Example 14

Cast coated paper (N mirror, manufactured by Oji Paper Co., Ltd., gloss surface smoothness of 3300 seconds) was used as a substrate. For the thermoplastic elastomer, 80 parts of polyisobutylene (VISTANEX MML-100, manufactured by Tonex Co., Ltd.) and 20 parts of silicone (SD-7220, manufactured by Dow Corning Toray Co., Ltd., solid fraction concentration 30%, functional group: vinyl group) were dissolved sequentially in toluene, 0.2 parts of a platinum catalyst (SRX-212, manufactured by Dow Corning Toray Co., Ltd.) was then added, and the resulting mixed solution was used as the release agent coating liquid. This release agent coating liquid was applied to, and dried on, the filler layer surface of the substrate, using a test coater at a process speed of 10 m/minute, to form a coating with a solid fraction of 1.0 g/m² (time from the application head until entry to the oven: approximately 1.1 seconds, oven maximum temperature 130° C., drying time 25 seconds), thereby yielding a release sheet with a release layer in which the organic silicon content of the surface layer at a depth of 5 nm was 26.6%.

Example 15

An acrylic based adhesive (BPS-5673, manufactured by Toyo Ink Manufacturing Co., Ltd.) was applied to, and dried on, the opposite surface to the release agent layer of the release sheet described in the Example 13, in sufficient quantity to form a coating of 25 g/m², and the dried product was then wound, yielding an adhesive tape.

Comparative Example 10

Cast coated paper (N mirror, manufactured by Oji Paper Co., Ltd., gloss surface smoothness of 3300 seconds) was used as a substrate. For the thermoplastic elastomer, 60 parts of polyisobutylene (VISTANEX MML-100, manufactured by Tonex Co., Ltd.) and 40 parts of silicone (SD-7220, manufactured by Dow Coming Toray Co., Ltd., solid fraction concentration 30%, functional group: vinyl group) were dissolved sequentially in toluene, 0.2 parts of a platinum catalyst (SRX-212, manufactured by Dow Coming Toray Co., Ltd.) was then added, and the resulting mixed solution was used as the release agent coating liquid. This release agent coating liquid was applied to, and dried on, the filler layer surface of the substrate, using a test coater at a process speed of 10 m/minute, to form a coating with a solid fraction of 1.0 g/m² (time from the application head until entry to the oven: approximately 1.1 seconds, oven maximum temperature 130° C., drying time 25 seconds), thereby yielding a release sheet with a release layer in which the organic silicon content of the surface layer at a depth of 5 nm was 32.4%.

Comparative Example 11

Cast coated paper (N mirror, manufactured by Oji Paper Co., Ltd., gloss surface smoothness of 3300 seconds) was used as a substrate. For the thermoplastic elastomer, 98 parts of polyisobutylene (VISTANEX MML-100, manufactured by Tonex Co., Ltd.) and 2 parts of silicone (SD-7220, manufactured by Dow Corning Toray Co., Ltd., solid fraction concentration 30%, functional group: vinyl group) were dissolved sequentially in toluene, 0.05 parts of a platinum catalyst (SRX-212, manufactured by Dow Corning Toray Co., Ltd.) was then added, and the resulting mixed solution was used as the release agent coating liquid. This release agent coating liquid was applied to, and dried on, the filler layer surface of the substrate of the Example 13, using a test coater at a process speed of 160 m/minute, to form a coating with a solid fraction of 0.6 g/m² (time from the application head A until entry to the oven: approximately 0.2 seconds, oven maximum temperature 130° C., drying time 8 seconds), thereby yielding a release sheet with a release layer in which the organic silicon content of the surface layer at a depth of 5 nm was 4.3%.

Comparative Example 12

Using the substrate disclosed in the Example 13, a long chain alkyl pendant type polymer (Peeloil 1010, manufactured by Ipposha Oil Industries Co., Ltd.) was dissolved in toluene as a release agent, and this solution was applied by hand to the filler layer surface of the substrate to form a coating with a solid fraction of 0.1 g/m², which was then placed in a dryer (time until entry to dryer; approximately 3 seconds) and dried for 30 seconds at 100° C., yielding a release sheet with a release layer in which the organic silicon content of the surface layer at a depth of 5 nm was 0%. Subsequently, a composition formed from 100 parts of natural rubber (RSS#3), 90 pairs of a petroleum resin (Quintone S-100, softening point 94° C., manufactured by Zeon Corporation) as an adhesion imparting agent, 25 parts of a terpene based liquid softening resin (Dimeron, manufactured by Yasuhara Chemical Co., Ltd.) as a softening agent, 0.8 paits of a cross linking agent (Millionate MR-100, manufactured by Nippon Polyurethane Industry Co., Ltd.) and 1 part of an age resistor (Nocrac NS-5, manufactured by Ouchishinko Chemical Industrial Co., Ltd.) was dissolved in toluene, applied to the opposite surface of the above release sheet to the release agent layer, in sufficient quantity to generate 40 g/m², dried, and then wound to form an adhesive tape.

The release sheets and the adhesive tapes produced in the Examples 13 to 15 and the Comparative Examples 10 to 12 described above were each evaluated using the methods described below, and the results of these evaluations are shown in Table 3 (release sheets) and Table 4 (adhesive tapes).

<Curability>

The curability of a release agent was evaluated by applying the release agent to a substrate, and then testing the drying conditions required to achieve a good curability as tested with the tip of a finger.

⊖: Good curability at, or prior to 120° C.×30 seconds (substrate temperature 85° C.).

○: Good curability at, or prior to 130° C.×30 seconds (substrate temperature 90° C.).

Δ: Good curability at, or prior to 140° C.×30 seconds (substrate temperature 95° C.) (usable limit for practical applications).

×: Poor curability even after 140° C.×30 seconds (substrate temperature 95° C.)

<Residual Adhesion>

An adhesive tape (polyester tape No. 31B, manufactured by Nitto Denko Corporation) was applied to the release agent layer surface of a release sheet or an adhesive tape, and following compression with a rubber roller, a load of 25 g/cm² was applied and the sheet or adhesive tape was stored at 70° C. for 20 hours. The adhesive tape was then removed from the surface of the release agent layer, left to stand for at least 1 hour at room temperature, and then applied to the polished surface of a stainless steel plate, and the adhesive strength (A) when peeling was performed at 180° at a speed of 0.3/minute was measured. Similarly, an adhesive tape (31B from Nitto Denko Corporation) was applied to a Teflon sheet, and following compression with a rubber roller, a load of 25 g/cm² was applied and the sheet was stored at 70° C. for 20 hours. The adhesive tape was then removed from the surface of the release agent layer, left to stand for at least 1 hour at room temperature, and then applied to the polished surface of a stainless steel plate, and the adhesive strength (B) when peeling was performed at 180° at a speed of 0.3/minute was also measured. The ratio of (A) and (B), namely (A/B)×100 was calculated as the residual adhesion (%).

<Writability>

An oil based marker pen was used to write on the surface of a release agent coating, and the time required until the writing could no longer be wiped off with tissue paper was measured and used for evaluation.

Θ: Wiping within 0 to 10 seconds of writing with a marker pen does not remove the writing.
○: Wiping within 11 to 30 seconds of writing with a marker pen does not remove the writing.
Δ: Wiping within 31 to 60 seconds of writing with a marker pen does not remove the writing (usable limit for practical applications).
×: Wiping at a point 61 seconds or more after writing with a marker pen does not remove the writing. Alternatively, even wiping at a point 61 seconds or more after writing with a marker pen still removes the writing.

<Thermal Transfer Printability>

Using a Datamax Corporation bar code label printer (PRODIGY PLUS LINERLESS) as the thermal transfer printer, and a commercially available ink ribbon (brand name: FSR-SA, manufactured by Fujicopian Co., Ltd.) as the ink ribbon, a bar code was printed on the release agent layer surface of an aforementioned release sheet, and the printing suitability was evaluated visually for (i) ink transferability and (ii) ink adhesion.

<Evaluation Standards>

(i) Transferability
○: Ink image on printing is well defined.
○Δ: Ink image on printing is essentially well defined.
Δ: Ink image on printing is somewhat defined (usable limit for practical applications).
Δ×: Ink image on printing is not well defined.
×: Ink does not transfer on printing, or excess ink transfers on printing.

(ii) Adhesion
○: Even if mending tape is applied to the printed surface and then peeled off, almost no ink is removed.
Δ: If mending tape is applied to the printed surface and then peeled off, a small amount of ink is removed (usable limit for practical applications).
×: If mending tape is applied to the printed surface and then peeled off, ink is removed.

<Releasability>

In accordance with JIS Z 0237, the adhesive coated surface of an adhesive tape (NEW DELTA TAPE, manufactured by Ojitac Co., Ltd.) was applied to a release agent coated surface, and after 30 minutes the release force was measured by a tensile test at 0.3 m/minute and 180°.

<Coefficient of Dynamic Friction>

Using a coefficient of friction test method according to JIS P 8147. the coefficient of dynamic friction in a horizontal direction was measured between the release agent treated surface of a release sheet or an adhesive tape and another similar release agent treated surface.

<Overlapping Adhesion>

Adhesive tape was applied to a corrugated fiberboard shipping box as defined in JIS P 3902 (K-7 strengthened corrugated fiberboard), additional adhesive tape was then applied to the back surface of the first adhesive tape, and the time taken for the overlapping adhesive tape to peel off was measured. 20 sample tests were performed and the number of samples which peeled off within each time period were counted and used for evaluation.
○: After 7 days, not one sample has peeled off.
Δ: After 7 days, no more than 5 samples have peeled off (usable limit for practical applications).
×: After 7 days, no more than 10 samples have peeled off.
××: All the samples have peeled off within 3 hours.

<Adhesive Tape Unwinding Characteristics>

The ease of operation in unwinding a prepared adhesive tape was evaluated.
○: Good ease of operation.
Δ: Reasonably good ease of operation (not problematic for practical applications).
×: Poor ease of operation (problematic for practical applications).

<Adhesive Tape Heat Resistance>

The heat resistance of an adhesive tape was evaluated by storing a prepared adhesive tape for 2 days in an atmosphere of 80° C., and then using a deformation continuous peeling tester (manufactured by Tester Sangyo Co., Ltd.) to observe the unwinding characteristics of the adhesive tape by looking for the presence of substrate failure during peeling of the tape at a peel speed of 30 m/minute.
○: No substrate failure, suitable for practical applications.
Δ: No substrate failure, but force required for unwinding is high, and unwinding is somewhat difficult (usable limit for practical applications).
×: Substrate failure, not suitable for practical applications.

TABLE 3

| | Silicone | Polymer resin | Organic silicon content (atomic %) | Curability | Residual adhesion (%) | Writability | Coefficient of dynamic friction | Thermal transfer printability Transferability/Adhesion | Release force (N/m) |
|---|---|---|---|---|---|---|---|---|---|
| Example 13 | 10 parts | 90 parts | 6.0 | Θ | 102 | Θ | 0.46 | o/o | 32 |
| Example 14 | 20 parts | 80 parts | 26.6 | Θ | 89 | Θ | 0.58 | o/o | 24 |
| Comparative Example 10 | 40 parts | 60 parts | 32.4 | Θ | 83 | Δ | 0.31 | Δx/Δ | 14 |
| Comparative Example 11 | 2 parts | 98 parts | 4.3 | Θ | 102 | Θ | 0.52 | x (exess) ./o | 89 |

TABLE 4

| | Organic silicon content (atomic %) | Residual adhesion (%) | Writability | Coefficient of friction | Overlapping adhesion | Unwinding characteristics | Heat resistance |
|---|---|---|---|---|---|---|---|
| Example 15 | 6.0 | 102 | Θ | 0.46 | ○ | ○ | ○ |
| Comparative Example 12 | 0 | 100 | Θ | 0.40 | ○ | Δ | x |

As is evident from Table 3, the release sheets of the Examples 13 and 14 had good writability and non-slip characteristics, and also displayed suitable releasability and printability using thermal transfer systems. Furthermore, the adhesive tape prepared in the Example 15 in Table 4 combined suitable unwinding characteristics and printability using thermal transfer systems.

In the Comparative Example 10 shown in Table 3, the writability and the thermal transfer printability was inferior, whereas in the Comparative Example 11, the ink transfer during thermal transfer printing was excessive, and the printed information could not be determined accurately. Furthermore, the adhesive tape prepared in the Comparative Example 12 of the Table 4 displayed good writability, non-slip characteristics and overlapping adhesion, but because the release force was high, the unwinding characteristics were poor, and after the heat resistance treatment, the adhesive tape could not be unwound.

INDUSTRIAL APPLICABILITY

In release sheets of a first and third aspect of the present invention, by restricting the organic silicon content in the outermost surface layer of a release agent layer formed by providing a blended release agent composition comprising a polydimethylsiloxane and a polymer resin on a substrate, the surface characteristics such as the writability, printability using thermal transfer systems, coefficient of friction and releasability and the like can be controlled with ease. Accordingly, a stable release sheet or adhesive tape of the required quality can be provided, making the invention applicable to many industrial fields.

A release sheet of a second aspect of the present invention displays excellent characteristics, including excellent releasability of the release agent layer from an adhesive layer, excellent printing and print recordability for thermal transfer systems, little susceptibility to blocking of the release agent layer surface, excellent non-slip characteristics, and no ink soiling. Accordingly, printing can be performed on the release agent layer, and if, for example, a non-transparent substrate is then stuck on top of the release agent via an adhesive layer, concealed printing is possible.

In this manner, because printing is possible on the release agent layer, production processes can be simplified and production costs can be reduced.

In addition, if filling treatment is conducted on the substrate, then penetration of the organic material layer can be prevented, which is also desirable.

Furthermore, if the ethylene content of the thermoplastic elastomer is at least 50 mass %, then the releasability from an adhesive layer improves even further.

In addition, provided the coefficient of dynamic friction in the horizontal direction of opposing release agent layers, measured in accordance with JIS P 8147. is at least 0.3, then secondary processing such as adhesive coating becomes easier.

Furthermore, an adhesive tape which utilizes such a release sheet does not require release paper, and printing and print recording using an ink ribbon or the like and a thermal transfer system can be performed directly onto the release agent layer surface on the back surface of the adhesive tape, meaning the tape is an environmentally friendly product which does not generate unnecessary wastage.

The invention claimed is:

1. An adhesive tape comprising a substrate, an adhesive layer provided on a first surface of said substrate, and a release agent layer of a release agent composition provided on a second surface of said substrate opposite said first surface, wherein said release agent composition comprises, as main components, a thermoplastic elastomer formed from at least one material selected from the group consisting of ethylene-propylene copolymers, ethylene-propylene terpolymers and ethylene-butene rubbers, as well as a polydimethylsiloxane, and a quantity of said polydimethylsiloxane within the release agent layer is within a range from 3 to 18 mass %, and an organic silicon content of a surface layer of the release agent layer at a depth of 5 nm, as measured by ESCA (Electron Spectroscopy for Chemical Analysis), is within a range from 5.8 to 25.4 atomic %.

2. An adhesive tape according to claim 1, wherein a release force of said adhesive layer relative to said release agent layer, based on JIS Z 0237, is within a range from 30 to 200 N/m.

3. An adhesive tape according to claim 2, in a wound state, wherein an unwinding force in an atmosphere of 23° C. and 50% RH, at an unwind speed of 0.3 m/minute, is within a range from 10 to 100 N/m.

4. An adhesive tape according to claim 3, wherein an adhesive is an acrylic based adhesive.

5. An adhesive tape according to claim 2, wherein an adhesive is an acrylic based adhesive.

6. An adhesive tape according to claim 1, in a wound state, wherein an unwinding force in an atmosphere of 23° C. and 50% RH, at an unwind speed of 0.3 m/minute, is within a range from 10 to 100 N/m.

7. An adhesive tape according to claim 6, wherein an adhesive is an acrylic based adhesive.

8. An adhesive tape according to claim 1, wherein an adhesive is an acrylic based adhesive.

* * * * *